Dec. 8, 1942.  E. K. NICKERSON  2,304,589
CYLINDER LINER
Filed Jan. 31, 1942
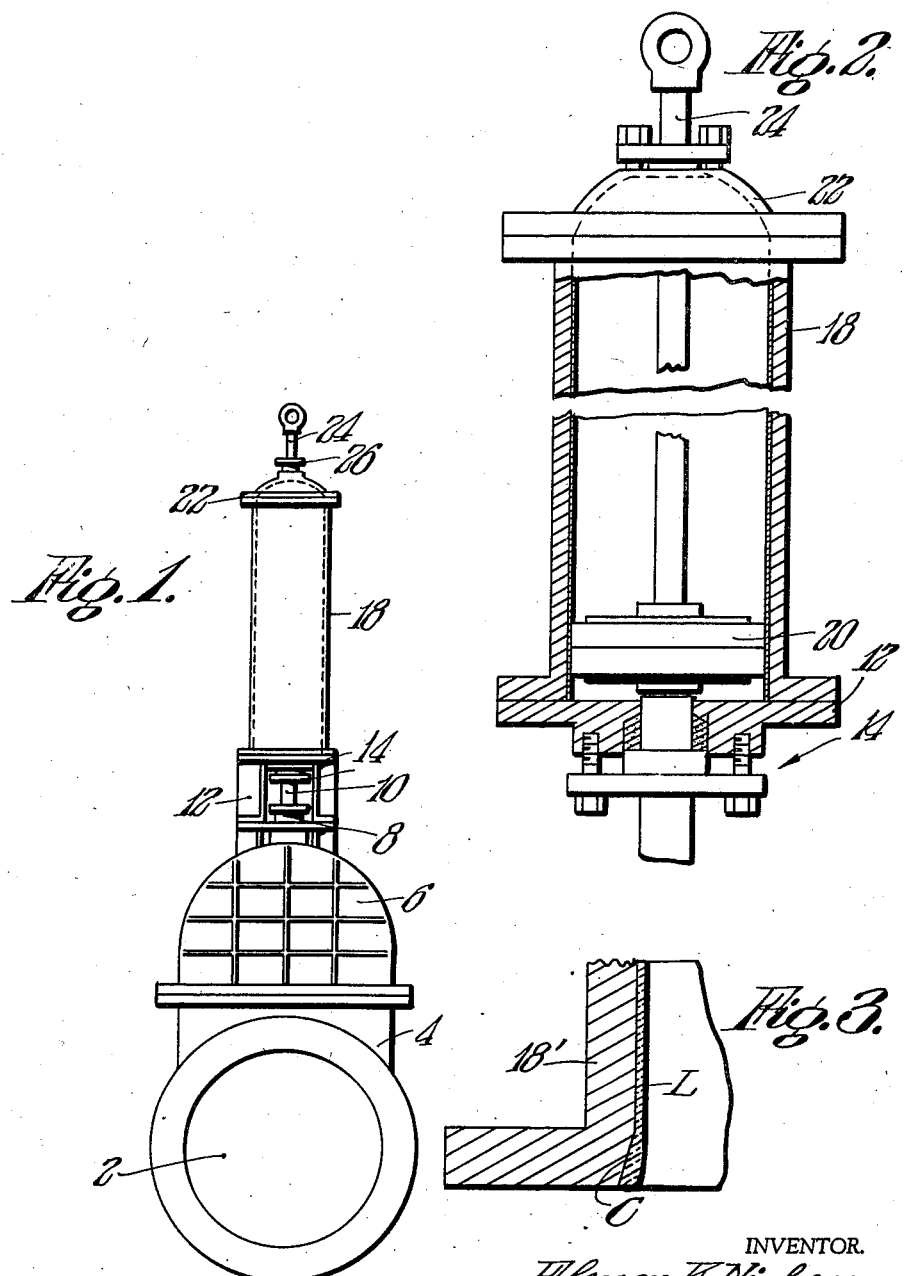
INVENTOR.
Elmer K. Nickerson
BY Walter C. Dorn Attorney Patented Dec. 8, 1942

2,304,589

UNITED STATES PATENT OFFICE 2,304,589

CYLINDER LINER

Elmer K. Nickerson, Springfield, Mass., assignor to The Chapman Valve Manufacturing Company, Indian Orchard, Mass., a corporation of Massachusetts Application January 31, 1942, Serial No. 429,061

2 Claims. (Cl. 309—3)

This invention relates to improvements in valves, sluice gates and the like and is directed more particularly to improvements in operating means for opening and closing valves, sluice gates and the like of the type which includes a piston reciprocable in a cylinder.

The principal objects of the invention are directed to a novel cylinder construction forming part of operating means for actuating the gate, wedge or plug of a sluice gate or valve for opening and closing the same.

It has been common practice in connection with cylinders having a piston reciprocable therein that are connected to the movable member of a valve or sluice gate to line the cylinder with a metallic tube. Such a tube has ordinarily been of brass, bronze or the like that is fitted or inserted in the bored out cylinder. Brass or similar metal has been preferred for the reason it resists corrosion to a much greater extent than the ferrous metal of which the cylinder is usually made.

According to the common practice the cylinder of ferrous metal is first machined so as to receive the non-ferrous brass or bronze lining tube the fit being such that the fit between the bore and tube are snug. The tube must fit the bore of the cylinder in proper manner so as to function as a lining and in some cases the fit is such as to require pressing of the tube into the bore under a considerable pressure.

While a tube lining the bore of the cylinder when of brass or some non-ferrous material is quite adequate to resist the corrosive and other injurious effects of water or such other liquids as are usually admitted into the cylinder for actuating the piston but the labor and material costs involved in providing the separate metal lining for the cylinder bore is considerable and is objectionable.

Furthermore, at the present time, tubing of all kinds is difficult to obtain and especially so in the case of non-ferrous tubing such as brass, bronze and the like, wherefore the problem of lining the cylinder bore is increased.

According to this invention, I provide a cylinder that is bored to the desired diameter and to which bore is applied a lining that is integral with the bore as distinguished from the prior art where a metal tube is inserted into the bore. That is after the finishing of the bore to the desired dimensions a material is applied thereto and the whole is subjected to heat so as to harden the material and provide a composite structure wherein a lining is bonded to and integral with the cylinder bore.

In this manner the expense of the separate tubular lining is obviated as well as the expense of fitting and installing the tube in the bore. Not only has a very considerable saving been effected but at the same time the difficulties brought about by the scarcity of tubing has been overcome. Also the difficulties and objections encountered by improper fitting of the tube and bore are entirely eliminated.

As an example, a group of five or six cylinders of a certain size were provided with linings in accordance with the invention at a cost which was less than the cost of one separate lining tube for a cylinder of the same size and, of course, the expense of fitting and inserting the linings was entirely obviated.

The material with which the cylinder is lined will preferably be porcelain or similar material that usually includes sand, gypsum, feldspar and related materials which may be applied in a fluid state to the bore and then subjected to heat so that the material is hardened and attached to or made integral with the cylinder wall.

The surface of the lining of the invention is very hard and smooth, of any appreciable thickness, it is not injuriously affected by the liquids used to propel the piston such as water and the like. The piston is usually provided with yieldable members such as cup leathers and a cylinder lined in accordance with the invention offers less resistance to movement of the piston than with the cylinder having the separate tubular lining while at the same time the movement of the piston is smooth and uniform during a cycle of operation.

The novel features of the invention are adapted for various uses but for purposes of disclosure will be described in connection with the cylinder forming a part of the operating means for a valve. Various changes and modifications may be made in the form of the invention without departing from the spirit and scope thereof.

In the drawing:

Fig. 1 is an elevational view of a valve embodying the novel features of the invention;

Fig. 2 is an enlarged partial sectional elevational view to illustrate the operating cylinder of the valve shown in Fig. 1 to explain the novel features of the invention; and Fig. 3 is an enlarged partial elevational view of the cylinder to explain a certain feature of the invention.

Referring now to the drawing more in detail, the invention will be more fully described.

The novel features of the invention are adapted for use in connection with the operating means of valves, sluice gates and various other appartus but is herein shown and described in connection with a gate valve for descriptive purposes.

A valve is represented in Fig. 1 which has a gate or wedge 2 that is movable up and down in a body 4. A bonnet 6 on the body has a stuffing box 8 through which a spindle 10 is reciprocable. The spindle 10 is secured to the gate or wedge 2 in the usual manner. A distance piece 12 on the bonnet has a stuffing box 14 through which the spindle 10 is reciprocable.

A cylinder represented by 18 is suported by the distance piece 12 and a piston 20 is reciprocable therein that is carried by the spindle 10. A cylinder 22 is provided on the upper end of the cylinder which co-operates with the distance piece to close the ends of the cylinder.

Pipes, not shown, are associated with the cylinder at upper and lower ends thereof so that fluid such as water under more or less pressure may be delivered thereinto and discharged therefrom. Pressure applied to the lower end of the cylinder causes the piston to move upwardly thereby moving the gate from off of its seat to open the valve while pressure applied to the upper end of the cylinder will bring about a reverse movement of the piston and close the valve.

There may be a rod 24 asssociated with the piston that is reciprocable in a stuffing box 26 associated with the cap 22 but this forms no part of the present invention.

As has been previously stated, it has been customary to bore or finish the cylinder bore to a certain diameter receiving a lining in the form of a tube ordinarily of non-ferrous material such as bronze, brass or the like.

It will be appreciated that since the tubular lining is separate from the cylinder that in order to make them fit, insofar as is possible, a considerable degree of accuracy in machining and fitting is necessary. Not only does this entail expense but the tubular lining itself is expensive so that the operating mechanism for a valve, sluice gate or the like is expensive. Furthermore, due to present day conditions it is difficult to obtain tubing to provide the lining.

According to this invention I provide a lining for the usually ferrous metal cylinder that is not only integral therewith but is as well adapted if not better adapted than brass or bronze to withstand the corrosive and other injurious effects of water and the like ordinarily used for the operation of such operating mechanisms.

To that end the cylinder is bored to the desired diameter and to the surface of the bore is applied a material, in a more or less liquid or semi-liquid state, that is hardened on being subjected to heat.

A material such as porcelain which some times includes sand, gypsum, felspar and the like has been found satisfactory. The porcelain lining material is applied to the surface of the bore in such a condition that the entire surface is adequately covered and then the cylinder and its lining are subjected to heat, as in a kiln or the like, for hardening the material. Proper heating brings about a hardening of the material so that there is provided an extremely hard and smooth lining.

It has been found that a lining relatively thinner than the wall of the usual brass or bronze tube is as satisfactory if not more so than the ordinary separate metal lining.

As an example, in a cylinder bore 12 inches in diameter it is customary to use a metallic tube having a wall thickness of approximately one-eighth inch whereas a porcelain lining of this invention, equal in all respects and in some respects superior, need not be but a few thousandths in thickness.

The porcelain material applied as it is and then hardened by heat provides an integral, composite structure including the cylinder and porcelain as distinguished from the non-integral and tube construction of the prior art. This not only overcomes the possibility of looseness between the separate cylinder and tube and prevents the pressure seepage sometimes occuring between the tubular lining and cylinder bore but the expense of the metal tube and the fitting thereof to the bore is eliminated.

It is believed that the poreclain material, applied as it is, enters to some extent the pores of the cylinder so that when hardened there is provided composite integral structure as distinguished from the prior art construction where the relatively thin walled metal tube is fitted in the cylinder bore. The lining provided in accordance herewith not only has the desired hardness, but has a smooth surface adapted for the reciprocation of the piston.

Pistons commonly used in operating mechanism of the class to which the invention relates are provided with cup leathers which operate on the porcelain lining more smoothly than on the metallic tubular lining of the prior art. That is, when pressure is applied for reciprocating the piston the rate of movement thereof is uniform throughout a cycle of operation and is not inclined to be non-uniform or jumpy as with prior art constructions which, of course, is desirable. Also there is less friction between the leather cups and porcelain lining than between said cups and the metal tube linings which is an advantage.

Since the porcelain material is applied to the cylinder bore in a semi-liquid or semi-plastic state there may be some downward flow or sagging thereof when the cylinder is set on its end. This would result possibly in the bore being somewhat smaller at its ends when the material is hardened. To overcome this tendency, if necessary, the bore at either one or both ends of the cylinder may be made larger than the normal bore to provide a somewhat greater thickness of material at the end or ends. This may be accomplished by tapering or chamfering the ends of the bore as in Fig. 3. This chamfer may be formed to suit conditions but will preferably be such as to overcome the tendency of a decrease in diameter of the bore at its end or ends should the porcelain material flow or sag to bring that condition about.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. As a new article of manufacture, a cylinder construction for hydraulically operated valve means comprising, a cylinder member of metal having a cylinder bore, provided with an outwardly tapering and flaring end portion, and a relatively thin porcelain lining on the walls of said bore in intimate contact therewith having portions engaging the pores of the metal so as to be integral with said walls and non-separable as a unit therefrom, with the inside diameter of the lining at the tapering end of the bore of substantially the same diameter as the remainder thereof.

2. As a new article of manufacture, a cylinder construction for hydraulically operated valve means comprising, a cylinder member of metal having a cylinder bore, and a relatively thin and hard porcelain lining on the walls of said bore formed by hardening liquid porcelain applied to said walls so that it is in intimate contact therewith and in engagement with the pores of the metal, whereby said lining is a composite integral part of the cylinder construction and non-separable as a unit therefrom.

ELMER K. NICKERSON.